US012466094B2

(12) United States Patent
Galanis et al.

(10) Patent No.: US 12,466,094 B2
(45) Date of Patent: Nov. 11, 2025

(54) BLADE ELEMENTS

(71) Applicant: Bic Violex Single Member S.A., Anoixi (GR)

(72) Inventors: Christos Galanis, Anoixi (GR); Charalampos Schizas, Anoixi (GR); Christos Ampatis, Anoixi (GR); Georgios Kanakaris, Anoixi (GR); Georgios Zotos, Anoixi (GR)

(73) Assignee: Bic Violex Single Member S.A., Anoixi (GR)

( * ) Notice: Subject to any disclaimer, the term of this patent is extended or adjusted under 35 U.S.C. 154(b) by 122 days.

(21) Appl. No.: 17/657,146

(22) Filed: Mar. 30, 2022

(65) Prior Publication Data

US 2022/0314477 A1 Oct. 6, 2022

(30) Foreign Application Priority Data

Mar. 31, 2021 (EP) .................................... 21166168

(51) Int. Cl.
*B26B 21/40* (2006.01)
*B26B 21/22* (2006.01)

(52) U.S. Cl.
CPC ........ *B26B 21/4031* (2013.01); *B26B 21/222* (2013.01); *B26B 21/4018* (2013.01); *B26B 21/4025* (2013.01)

(58) Field of Classification Search
CPC .............. B26B 21/4031; B26B 21/222; B26B 21/4018; B26B 21/4025; B26B 21/4037;
(Continued)

(56) References Cited

U.S. PATENT DOCUMENTS 1,024,348 A * 4/1912 Lorenzen ................ B26B 21/16 30/51
1,845,160 A * 2/1932 Lewis ..................... B26B 21/18 30/77
(Continued)

FOREIGN PATENT DOCUMENTS

EP 3292964 B1 4/2020
JP 2013099467 A 5/2013
(Continued)

OTHER PUBLICATIONS

European Search Report issued in European Application No. 21166168.1 on Sep. 23, 2021 (4 pages).
(Continued)

*Primary Examiner* — Adam J Eiseman
*Assistant Examiner* — Robert D Cornett
(74) *Attorney, Agent, or Firm* — Bookoff McAndrews, PLLC

(57) ABSTRACT

A blade element for a razor cartridge includes a blade support, a blade and a comb-like element. The blade support includes a base portion and a bent upper portion. The blade is arranged at the upper portion of the blade support and includes a cutting edge. The comb-like element includes a shaft and a plurality of teeth. The comb-like element is arranged parallel to the blade. The plurality of teeth extend parallel to each other form the shaft to beyond the cutting edge of the blade. Further, the comb-like element is disposed above the blade.

20 Claims, 5 Drawing Sheets

(58) Field of Classification Search
CPC ....... B26B 21/565; B26B 21/00; B26B 21/02; B26B 21/14; B26B 21/16; B26B 21/22; B26B 21/40; B26B 21/4006
USPC ..................... 30/78, 34.2, 77, 47–51, 55, 59
See application file for complete search history.

(56) References Cited

U.S. PATENT DOCUMENTS

| | | | | | |
|---|---|---|---|---|---|
| 1,908,016 | A * | 5/1933 | Harmon | B26B 21/18 | 30/76 |
| 3,750,285 | A * | 8/1973 | Michelson | B26B 21/4006 | 30/78 |
| 4,912,846 | A * | 4/1990 | Yu | B26B 21/4006 | 30/346.55 |
| 5,416,974 | A * | 5/1995 | Wain | B26B 21/227 | 30/57 |
| 6,161,288 | A * | 12/2000 | Andrews | B26B 29/00 | 30/527 |
| 6,243,951 | B1 * | 6/2001 | Oldroyd | B26B 21/4018 | 30/34.2 |
| 7,111,401 | B2 * | 9/2006 | Richard | B26B 21/4018 | 30/59 |
| 8,782,903 | B2 * | 7/2014 | Clarke | B26B 21/4043 | 30/50 |
| 9,862,108 | B2 * | 1/2018 | Davos | B26B 21/58 | |
| 10,562,198 | B2 * | 2/2020 | Clarke | B26B 21/4018 | |
| 11,376,755 | B2 * | 7/2022 | Fingold | B26B 21/12 | |
| 2006/0196054 | A1 * | 9/2006 | Luxton | B26B 21/4025 | 30/50 |
| 2010/0281694 | A1 * | 11/2010 | Royle | B26B 21/4031 | 30/527 |
| 2014/0000082 | A1 * | 1/2014 | Xu | B26B 21/4018 | 29/423 |
| 2020/0398449 | A1 * | 12/2020 | Claus | B26B 21/565 | |
| 2021/0094196 | A1 * | 4/2021 | Schizas | B26B 21/44 | |

FOREIGN PATENT DOCUMENTS

| | | | | | |
|---|---|---|---|---|---|
| WO | 2007116397 | A3 | | 4/2009 | |
| WO | WO-2012158141 | A1 | * | 11/2012 | B26B 21/565 |

OTHER PUBLICATIONS

Intuition® F.A.B.@ Razor—Schick. https://www.schick.com/products/intuition-fab-razor. Edgewell, 2022 [retrieved on Mar. 23, 2022]. Retrieved from the Internet (4 pages).

* cited by examiner

BLADE ELEMENTS

CROSS REFERENCE TO RELATED APPLICATION

This application claims priority from European patent application EP21166168.1, filed on Mar. 31, 2021, its content being incorporated herein by reference.

TECHNICAL FIELD

The present disclosure relates to blade elements, razor cartridges and shaving razor assemblies.

BACKGROUND

Safety razors with multiple blades have been known for quite some time. However, there is an ongoing effort to improve the properties and the safety of safety razors with multiple blades. In use, a user holds the razor handle and brings the razor cartridge into contact with a portion of skin. By movement of the razor cartridge in a shaving direction, unwanted hair is removed. Independently of the use of uni-directional (forward) shaving safety razors or of recently developed multi-directional (e.g. forward and backward) shaving safety razors, some users with e.g. unruly or curly hairs may have some difficulties to shave safely and efficiently. The orientation of the hairs on the skin may require multiple cutting passes, eventually even by approaching the hairs from different directions. This often leads to an increased shaving time as well as an increased risk of irritating or injuring the user's skin. Some safety razors are provided with safety grids that extend partially or all along the shaving surface of the razor cartridge. However, these designs are imposing and may lead to imprecise shaving.

It is therefore an object of the present disclosure to provide a safety razor presenting an improved shaving behavior.

SUMMARY

In a first general aspect, the present disclosure relates to a blade element for a razor cartridge including a blade support, a blade and a comb-like element. The blade support includes a base portion and a bent upper portion. The blade is arranged at the upper portion of the blade support and includes a cutting edge. The comb-like element includes a shaft and a plurality of teeth.

The comb-like element is arranged parallel to the blade. The plurality of teeth extend parallel to each other form the shaft to beyond the cutting edge of the blade. Further, the comb-like element is disposed above the blade.

In a second general aspect, the present disclosure relates to a razor cartridge including a razor cartridge housing and a group of cutting members, wherein at least one cutting member is a blade element according to the first general aspect. The cutting members are arranged behind one another between a first longitudinal side and a second longitudinal side of the razor cartridge housing.

In a third general aspect, the present disclosure relates to a shaving razor assembly including a razor handle and a razor cartridge according to the second general aspect.

Particular examples of the first to third general aspects can be implemented so as to realize one or more of the following advantages.

First, the blade element of the present disclosure provides for a preliminary orientation of the hairs to be cut. By passing the blade element along the skin, the hairs are oriented and guided by the comb-like element such as to face the cutting edge of the blade. With this, unruly and/or curly hairs may be combed such that the cutting is facilitated. This allows for a quick and proper shaving in a low number of passes—ideally in one pass—and avoids approaching the hairs several times, eventually even from different directions. Moreover, the comb-like element of the blade element can provide for additional skin support to reduce skin bulge and, in turn, nicks and cuts. The comb-like element being in contact with the skin while shaving, the skin is evened in the contact area, which allows for a better positioning of the hairs towards the cutting edge.

Second, each blade element of the present disclosure provides for an individual and dedicated protection. In fact, each comb-like element is part of the blade element, which allows to configure the razor cartridge depending on the razor properties. Compared to razor cartridges having a safety grid covering part or all of the shaving surface, the embodiments of the present disclosure provide for more flexibility in the choice of the type of cutting elements forming the razor cartridge. Any combination of cutting members without comb-like elements and blade elements according to the present disclosure (i.e. with comb-like element), or a razor cartridge consisting only of blade elements is possible.

Third, the blade elements can be used in multi-directional safety razors as forward as well as backward cutting members, without the need for any specific dimensional nor functional adaptation of the blade element itself or of the razor cartridge housing. This increases the flexibility in the arrangement of the cutting members including the blade elements in the razor cartridge housing and allows for a usage of the blade elements in different razor product configurations. Due to a possible uniform design, the diversity of blade elements can be reduced. As a result, costs such as e.g. manufacturing and logistic costs can be reduced.

All these aspects and others contribute to the fact that the shaving efficiency, performance and safety is improved and that the manufacturing of the safety razor products is facilitated and more cost-efficient.

Certain terms are used in the following manner in the present disclosure:

The expression "connected to" is not limited to a direct connection between two objects (i.e., it is not required that the two objects abut). For instance, a first object and a second object can be indirectly connected through a third object (e.g., a cutting edge portion can be indirectly connected to an edge of the base portion through another component such as a blade mounting portion).

The expression "extending at an angle" relates to an angle which is smaller than 180° (e.g., smaller than 160°). Moreover, the expression "extending at an angle" specifies that the first object extending at an angle and the second object from which the first object extends inscribe the angle (e.g., the base portion extends in a first vertical direction and the cutting edge portions and the base portion define an inscribed angle). The expression "extending at an angle" includes but does not require direct contact between the first object extending at an angle and the second object from which the first object extends.

A "sheet of material" is an elongated piece of material having an extension in a first direction (e.g., a thickness) which is (substantially) smaller (e.g., at least 10 times smaller or at least 50 times smaller) than each of the extensions in a second and third direction (all directions being mutually orthogonal). Thus, a "sheet of material"

forms a first broad surface and a second, opposite broad surface. The term "sheet of material" relates to the geometry and not to a class of material (e.g., a "sheet of material" can include or consist of a metal or alloy or a plastic material). The term "sheet of material" can relate to a substantially planar form factor (having a thickness that is at least 10 times smaller or at least 50 times smaller than a length and a width). However, a "sheet of material" does not have to be perfectly flat and/or planar. In some examples, a sheet of material can include features such as protrusions, slots or holes in the broad surfaces of the sheet of material and/or at the edges.

The term "edge" refers to a boundary limiting an object (e.g., the base portion). This does not necessarily mean that there is a material boundary. For instance, the base portion can be directly connected to blade mounting portion (e.g., these elements can be formed from the same sheet of material) but nevertheless there can be an edge limiting the base portion.

The term "fixedly attached" relates to a permanent or non-detachable attachment. For instance, a weld connection or an adhesive can be used to fixedly attach two objects. Two objects connected by a screw connection or a clip connection or by friction/releasable pressing forces, on the other hand, are not "fixedly attached".

DETAILED DESCRIPTION

In the figures, any like parts and components are referenced with like numbers.

Figure 1A:
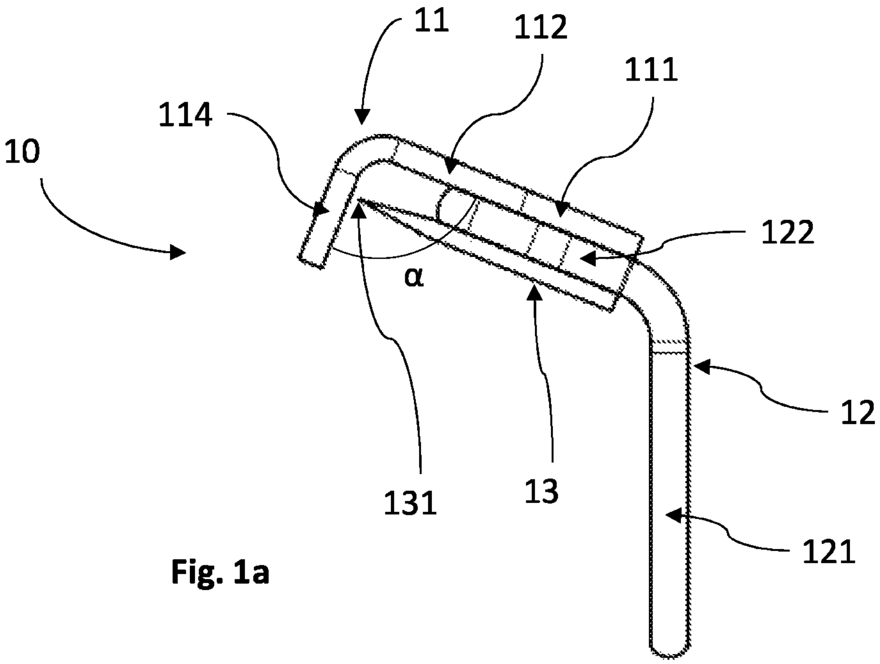
FIGS. 1*a* to 1*c* show a first example of a blade element according to the present disclosure.
Figure 1B:
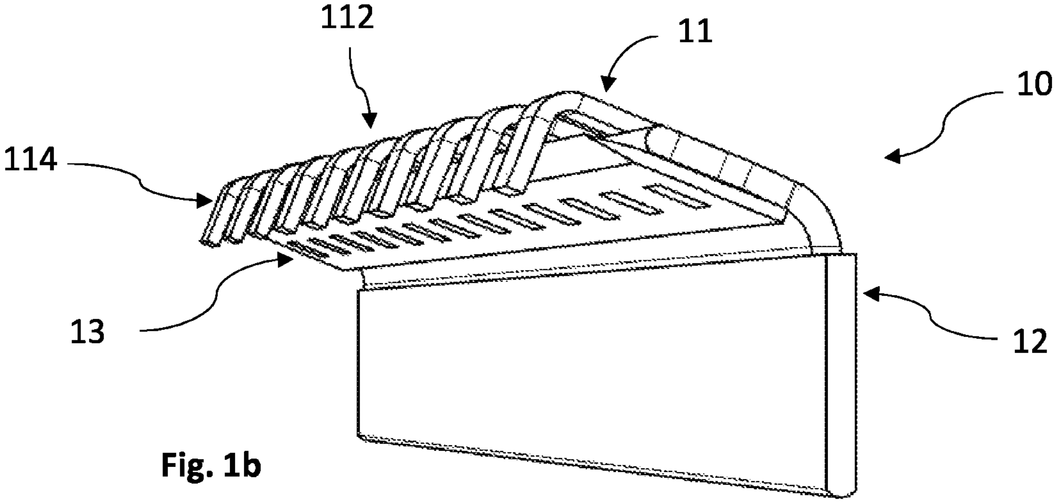
Figure 1C:
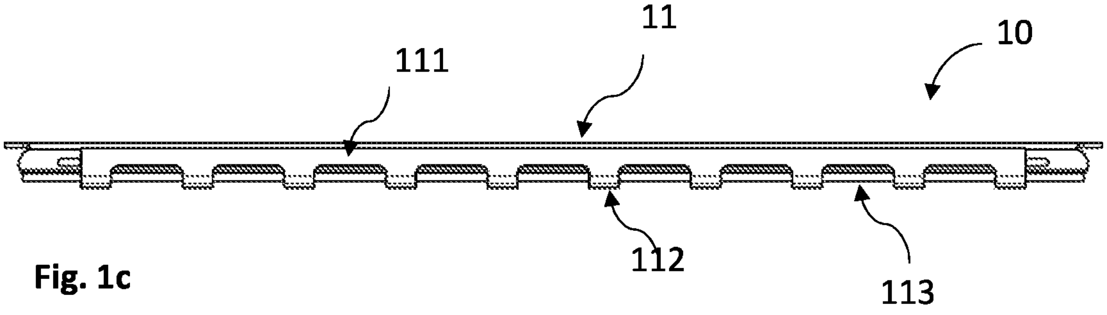

FIG. 1*a* illustrates a side view of a first example of a blade element according to the present disclosure. FIG. 1*b* illustrate a 3D view of this first example of blade element. FIG. 1*c* illustrates a top view of this first example of blade element.

As shown in FIG. 1*a*, a blade element 10 comprises a blade support 12, a blade 13 and a comb-like element 11. The blade support 12 comprises a base portion 121 and a bent upper portion 122. The blade 13 is arranged at the upper portion 122 of the blade support 12 and comprises a cutting edge 131. The comb-like element 11 comprises a shaft portion 111 and a plurality of teeth 112 (as shown in FIG. 1*c*). Further, the comb-like element 11 is arranged parallel to the blade 13, and the plurality of teeth 112 extend parallel to each other from the shaft portion 111 to beyond the cutting edge 131 of the blade 12. As visible in any of the figures, the comb-like element is disposed above the blade.

As can be seen in FIG. 1*b*, the blade element 10 can be elongated in its longitudinal direction, wherein each of the blade, the blade support and the comb-like element can be elongated. The comb-like element 11 and the blade 13 can be fixedly attached to the blade support 12. Herein, the comb-like element 11 and the blade 13 can be arranged on either side of the upper portion 122 of the blade support 12. The blade 13 can be attached to the bottom of the upper portion 122 of the blade support 12 by any suitable technique. In some examples, the blade 13 can be attached to the blade support 12 by welding. In other examples, the blade may be attached to the blade support by an adhesive or by soldering. In some examples, additional elements may be arranged between the blade and the blade support in a fixedly connected manner. In the same manner, the comb-like element 11 can be attached to the top of the upper portion 122 of the blade support 12 by any suitable technique. In some examples, the comb-like element 11 can be attached to the blade support 12 by welding. In other examples, the comb-like element may be attached to the blade support by an adhesive or by soldering. In some examples, additional elements may be arranged between the comb-like element and the blade support in a fixedly connected manner.

Figure 3:
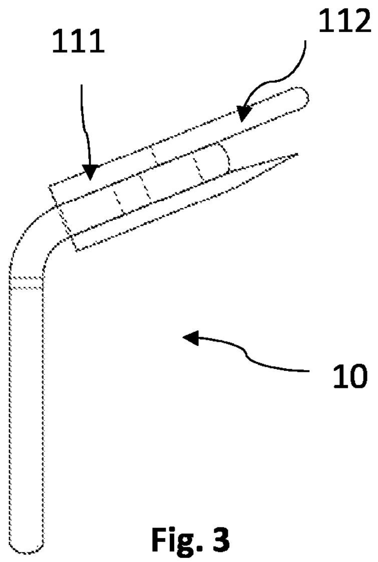
FIG. 3 and FIG. 4 show further examples of blade elements according to the present disclosure.

The shaft portion 111 of the comb-like element 11 is visible in FIG. 1*c*. In any embodiment of the blade element 10, the plurality of teeth 112 can be integrally formed with the shaft portion 111 (see also second example in FIG. 2*b* and further examples in FIG. 3 and FIG. 4). In an alternative not shown, the plurality of teeth can be coupled to the shaft portion by e.g. latches or any other fixation means. Alternatively, the plurality of teeth can be coupled and/or fixed to the shaft portion by e.g. welding, gluing or others. As shown in FIG. 1*c*, each tooth 112 can have the same width and each space 113 between two adjacent teeth 112 can be constant. Alternatively, the width of the teeth can vary and/or the width of the space between two adjacent teeth can vary. Moreover, as shown in the second example of the blade element 10 in FIG. 2*b*, which will be described later, the width of the teeth 112 may correspond to the width of the space 113 between two adjacent teeth 112. Returning to FIG. 1*c*, the width of the space 113 between two adjacent teeth 112 can be bigger than the width of the teeth 112. Alternatively, the width of the space between two adjacent teeth can be smaller than the width of the teeth. FIG. 1*c* further shows that the length of the comb-like element 11 (in particular the length of the shaft portion 111) can be shorter than the length of the blade support 12 and/or the length of the blade 13. Alternatively, the comb-like element may have the same length or may be longer than the blade support and/or the blade. In this case, the entire length of the blade support and/or the blade may be protected by the comb-like element.

As shown in the example of the blade element illustrated in FIGS. 1*a* to 1*c*, each tooth 112 of the comb-like element 11 can include a portion 114 that is bent about the cutting edge 131 of the blade 13. This portion 114 is generally situated at a distal end of the tooth 112 and can be integrally formed with the tooth 112. The length of the bent portion 114 of the teeth 112 can vary depending on the intended blade coverage degree. Further, the end of the tooth 112, which can simultaneously be the end of the bent portion 114 of the tooth 112, may be rounded (see FIG. 3). Any not wanted sharp edge on the comb-like element may be avoided in order to not harm the skin of the user during shaving nor any other body member of the user during handling of the safety razor. The teeth may be e.g. flat or domed, have a rectangular or rounded form, have all the same shape or have different shapes. Any other shape, form and texture may be possible. The bent portion and/or the rounded end are not limited to the first example of blade element but may be present in any other embodiment of blade element. The comb-like element may be formed of a single sheet of material, e.g. of a metal sheet, that has been bent accordingly to the required design of the teeth. The teeth of the comb-like element may be stamped or machined. Alternatively, the comb-like element may be molded. Alternatively, the shaft and the teeth may be formed of multiple fixedly connected (e.g. by welding) sheets of material, e.g. metal sheets. Alternatively, the comb-like element may be of a plastic material such as a polymer.

Figure 2A:
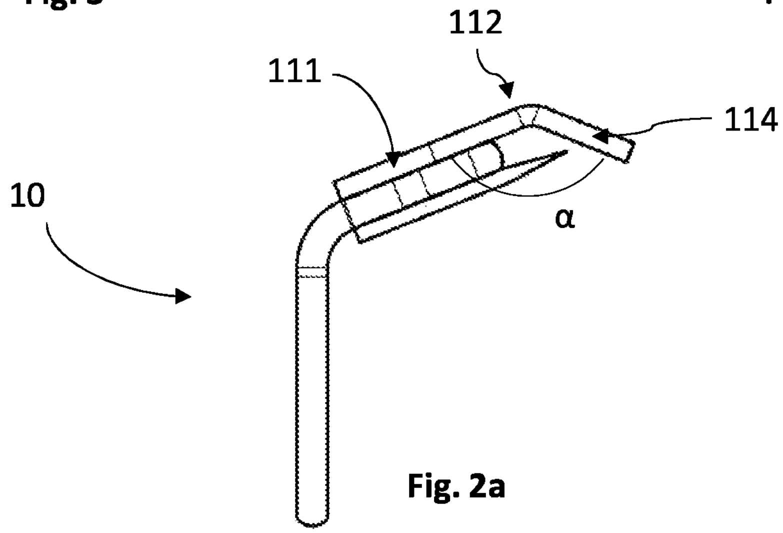
FIGS. 2*a* and 2*b* show a second example of a blade element according to the present disclosure.
Figure 2B:
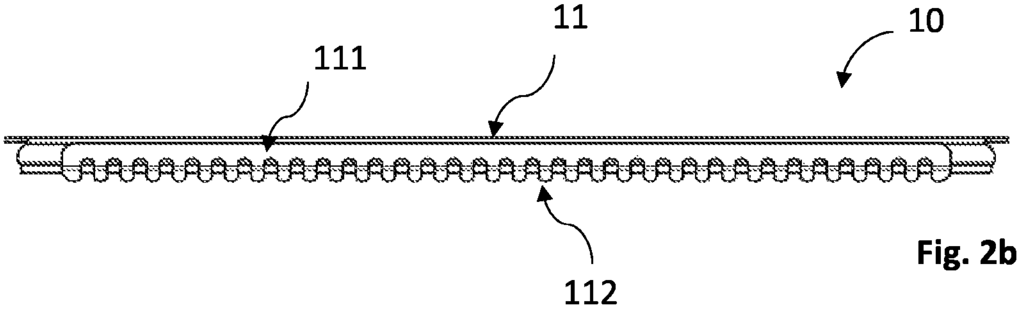

Further, the bent portion 114 of each tooth 112 as shown in FIGS. 1*a* and 1*b* can be bent at an angle α of 90° towards a plane surface formed by the shaft portion 111 of the comb-like element 11 and/or a first portion of the plurality of teeth 112 extending from the shaft portion 111. This plane surface serving as reference to the angle α can also be defined by the surface of the upper bent portion 122 of the blade support 12. In some embodiments, the angle α may be more than 90°. Particularly, the angle α may be in a range of 90° to 180°. FIGS. 2*a* and 2*b* illustrate a second example of a blade element 10 according to the present disclosure. Here, the bent portion 114 of each tooth 112 is represented with an angle α of approximatively 135°. In another example illustrated in FIG. 3, the plurality of teeth 112 of the comb-like element 11 may not present a bent portion 114 (alternatively, the bent portion 114 may be at an angle of 180°). The teeth 112 can extend beyond the cutting edge 131 of the blade 13, or alternatively extend to the cutting edge of the blade.

Figure 4:
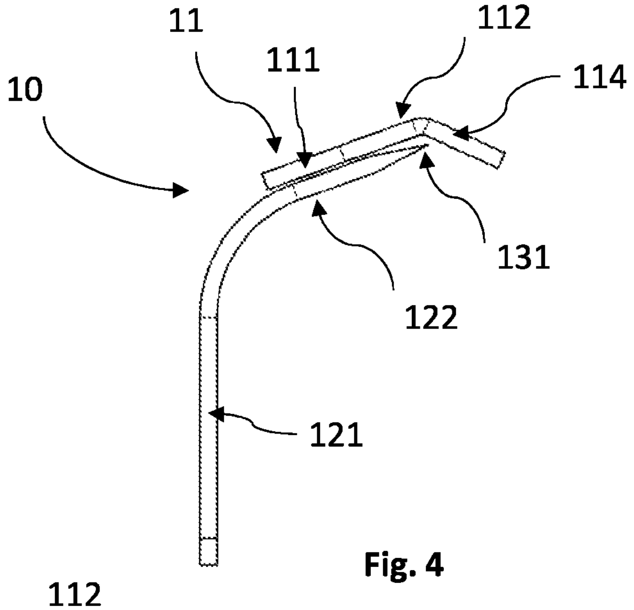

In still another example as shown in FIG. 4, the blade can be integrally formed with the blade support. In more detail, the integrally formed element can include a base portion 121 and a bent upper portion 122, which also forms the blade including the cutting edge 131. In other words, the blade can be a prolongation of the bent upper portion of the blade support. Further, the comb-like element 11 can be fixedly attached on top of the upper portion 122 of the integrally formed blade support and blade. For this, the comb-like element 11 can be attached to the top of the upper portion 122 of the integrally formed blade support and blade by any suitable technique. In some examples, the comb-like element 11 can be attached to the integrally formed blade support and blade by welding. In other examples, the comb-like element may be attached to the integrally formed blade support and blade by an adhesive or by soldering. In some examples, additional elements may be arranged between the comb-like element and the integrally formed blade support and blade in a fixedly connected manner. The blade support and the blade may be integrally formed of a single sheet of material, e.g. a metal sheet.

Alternatively, the blade support and the blade may be formed of multiple fixedly connected (e.g. by welding) sheets of material, e.g. metal sheets.

In use, the comb-like element is configured to get in contact with the skin of the user. The skin contacting surface of the comb-like element may include a lubricating coating, which may present hydrophobic or hydrophilic properties. Examples of such coatings may include polyfluorocarbone, for example polytetrafluoroethylene (PTFE). Alternatively, the coating may be a hydrogel coating. Generally, the coating may provide a reduction of the friction between the razor cartridge and the skin. Further, the surface of the comb-like element in contact with the skin may include a wound healing and/or an anti-bacterial agent.

In examples, part or all of the comb-like element may present color properties. For instance, different colors may be provided on the comb-like surface in order to distinguish the male from the female utilization and vice-versa. For instance, the comb surface can be blue when intended to a man safety razor, and red or pink when intended to a woman safety razor. In other examples, the comb-like element may have a thermochromic coating, that may be configured to change color depending on its temperature. As an example, when the user pours hot water on the blades then he/she will know when the blades are hot for use. In still other examples, the comb-like element may be provided with a material which may have properties allowing a change of color after a certain amount of uses. For instance, the surface of the comb-like element may be green when new (i.e. never utilized) and becomes red when worn.

In examples not shown, the comb-like element may be integrally formed with the blade support. The comb-like element may be a prolongation of the blade support such that the shaft and the bent upper portion of the blade element are merged as one and such that the plurality of teeth extend from the merged shaft and upper portion. In a first portion, the teeth may extend co-planar to the bent upper portion of the blade element. In these examples, the blade may be fixedly attached on the bottom of the integrally formed blade support and comb-like element. In some examples, the blade may be attached to the integrally formed blade support and comb-like element by welding. In other examples, the blade may be attached to the integrally formed blade support and comb-like element by an adhesive or by soldering. In some examples, additional elements may be arranged between the blade and the integrally formed blade support and comb-like element in a fixedly connected manner.

Any geometrical (e.g. shapes), dimensional and material characteristics of the blade elements as described above may apply (with adjustments where needed) to the just disclosed examples of blade elements wherein the comb-like element is integrally formed with the blade support. For example, each tooth of the plurality of teeth may include a portion that is bent about the cutting edge of the blade by an angle α which can be in the range of 90° to 180° towards the plane formed by the integrally formed upper portion of the blade support and the shaft of the comb-like element. Alternatively, the teeth may not present a bent portion, but extend straight from the integrally formed shaft and upper portion of the blade support. The integrally formed blade support and comb-like element may be formed of a single sheet of material, e.g. of a metal sheet, that has been bent accordingly to the required design of the blade support and the plurality of teeth. Alternatively, the integrally formed blade support and comb-like element may be stamped or machined. Alternatively, the integrally formed blade support and comb-like element may be molded. Alternatively, the integrally formed blade support and comb-like element may be of a plastic material such as a polymer.

Figure 5A:
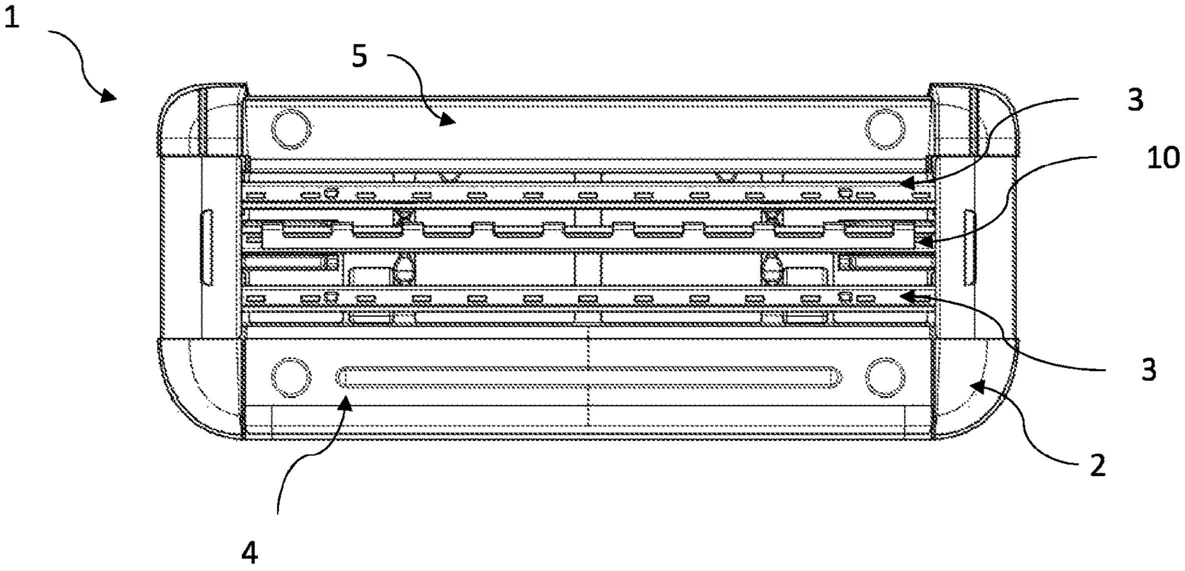
FIGS. 5*a* and 5*b* show a razor cartridge according to the present disclosure, including a blade element according to FIGS. 1*a* to 1*c*.
Figure 5B:
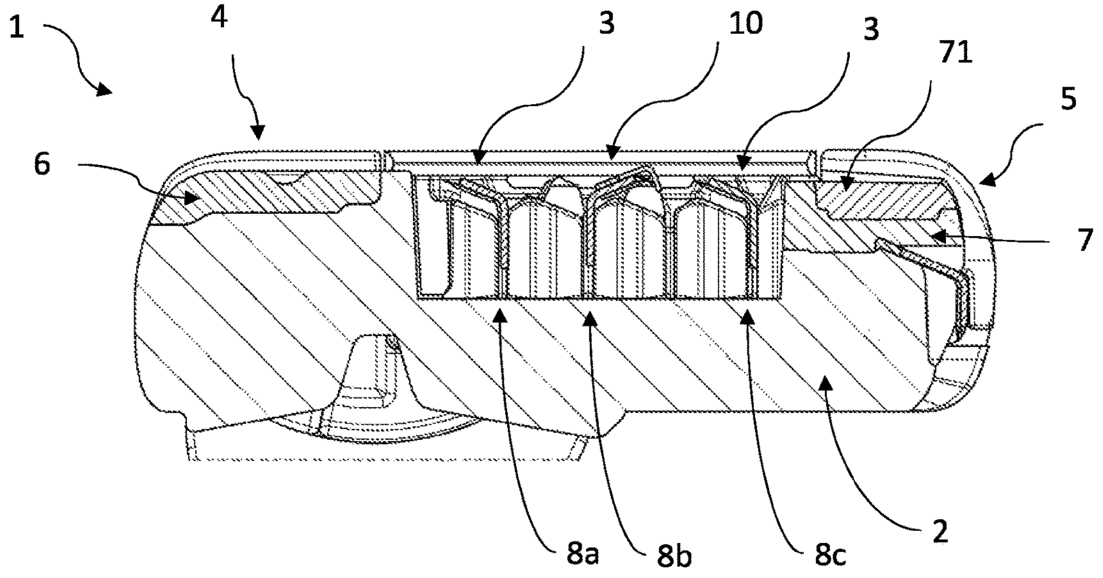

FIG. 5*a* illustrates a top view of a razor cartridge 1 according to the present disclosure, including a blade element 10 according to FIGS. 1*a* to 1*c*. FIG. 5*b* illustrates a side cut view of the same razor cartridge 1. As shown in FIG. 5*a*, the razor cartridge 1 comprises a razor cartridge housing 2 and a group of cutting members 3, wherein at least one cutting member is a blade element 2 according to any of the blade elements described in the present disclosure.

Each cutting member 3 can include a blade support and a blade with a cutting edge. The blade support can include a base portion and a bent upper portion. The blade can be fixedly attached to the bottom of the blade support. The blade can be attached to the bottom of the upper portion of the blade support by any suitable technique. In some examples, the blade can be attached to the blade support by welding. In other examples, the blade may be attached to the blade support by an adhesive or by soldering. In some examples, additional elements may be arranged between the blade and the blade support in a fixedly connected manner. Alternatively, the blade may be attached on the top of the blade support or the blade may be integrally formed with the blade support. Any other cutting member as known in the art may be considered.

Returning to FIGS. 5*a* and 5*b*, the cutting members are arranged behind one another between a first longitudinal side 4 and a second longitudinal side 5 of the razor cartridge housing. For simplicity, the cutting members 3 and blade elements 10 may be numerated from 1 (or first cutting member/blade element) to x (or last cutting member/blade element) according to their position in the razor cartridge housing 2, starting from the first longitudinal side 4 of the razor cartridge 1 to the second longitudinal side 5, and wherein x is the total amount of cutting members 3 and/or blade elements 10 disposed in the razor cartridge housing 2.

In the example of FIGS. 5*a* and 5*b*, and as shown in FIG. 5*b*, the razor cartridge housing 2 includes a skin guard 6 (skin member) arranged at the first longitudinal side 4 and a cap element 7 (cap member) (e.g., including a lubricating strip 71 or other skin care element) arranged at the second longitudinal side 5. This arrangement corresponds to a razor cartridge 1 which is designed to be moved so that the first longitudinal side 4 comes at first into contact with an area of skin to be treated. In other examples, a razor cartridge can also be arranged differently. For instance, in view of two possible shaving directions, other elements than a skin guard and a cap can be arranged at the first and second longitudinal sides of the razor cartridge. For example, both the first and second longitudinal sides could include a skin guard (e.g., to prepare the skin to be treated for the imminent shaving operation, e.g., by erecting the hair) and/or a cap element configured to treat the skin after a shaving operation. In some examples the razor cartridge does not have a preferred shaving direction (but is configured substantially symmetrical with respect to the skin contacting elements).

As shown in FIGS. 5*a* and 5*b*, the first and third cutting members 3 are oriented toward the first longitudinal side 4, i.e. the cutting edges of the cutting members 3 point in direction of the first longitudinal side 4 of the razor cartridge housing 2. The blade element 10, which is situated at second position between the first and second cutting members 3, is oriented toward the second longitudinal side 5 of the razor cartridge housing 2, i.e. its cutting edge points in direction of the second longitudinal side 5.

FIGS. 6 to 10 illustrate schematical side views of different possible but not limiting examples of razor cartridges, wherein each example presents a different arrangement of cutting members 3 and blade elements 10 in the razor cartridge housing. In each example, the razor cartridge housing is represented by its first longitudinal side 4 and its second longitudinal side 5. In addition, the razor cartridges as shown can include one, some or no cutting member 3, but at least one blade element 10 according to the present disclosure. The amount of cutting members 3 and blade elements 10 is not limited and can be more or less than illustrated in the figures. The type of blade elements can be any of those disclosed herein (i.e. illustrated as well as non-illustrated ones). The distance between the different components shall not be representative. Even if not limited to the illustrated examples, only the direction of the cutting members 3 and/or the blade elements 10 as well as the sequencing of the cutting members 3 and/or blade elements 10 within the razor cartridge housing shall be of importance in FIGS. 6 to 10.

Each of FIGS. 6 to 10 show at least one blade element 10. The at least one blade element 10 can be movably or rigidly arranged within the razor cartridge housing in a direction orthogonal to a shaving plane SH defined by a skin-contacting side of the razor cartridge housing (i.e., the blade element 10 can move in a vertical direction as described above). As shown in FIG. 5*b*, the razor cartridge housing 2 provides respective seat portions 8*a*, 8*b*, 8*c* for attaching the base portion 121 of the blade support 12 of the blade element 10. The seat portion 8*a*, 8*b*, 8*c* can include an elastic element (e.g., leaf spring—not shown in FIG. 5*b*) to allow the movement of the blade elements 10. In other examples, the base portion 121 of the blade support 12 of the blade element 10 is rigidly connected to the razor cartridge housing 2 (i.e., the base portion 121 cannot move relative to the razor cartridge housing 2). At least one or several or all blade elements may be rigidly or movably arranged within the razor cartridge housing. Similarly and/or optionally, at least one cutting member 3 other than a blade element (or several or all cutting members 3, that are not blade elements, of the group of cutting members) can be rigidly or movably arranged within the razor cartridge housing 2. Alternatively, in some examples, only at least one or some predetermined blade elements such as e.g. only the blade elements oriented towards the first longitudinal direction, or only the blade elements oriented towards the second longitudinal direction, or only the blade elements arranged between two cutting members, or only the blade elements arranged at a first position seen from the first longitudinal side of the razor cartridge housing, or only blade elements presenting any other particularity may be fixedly or alternatively movably arranged within the razor cartridge housing. In any example and alternative thereof, the cutting members and/or blade elements may be movably retained in the seat portions of the razor cartridge housing.

Further, in FIGS. 6 to 10, the line joining the first longitudinal side 4 and the second longitudinal side 5 represents the shaving plane SH. The shaving plane SH is defined as the plane between the most prominent members of the housing of a razor cartridge 1. For example, the shaving plane SH may be defined as the plane between a guard member and a cap member that contact a user, in use. The shaving plane SH represents the theoretical position of the surface being shaved, which may be the skin. The shaving plane SH and a cutting-edge plane if the cutting edge of the cutting members lies in the same plane as the shaving plane, e.g. when the cutting edges are in the same plane as the guard and cap member. Based on that, an exposure of the cutting-edge plane with respect to the shaving plane can be designated as negative, neutral, or positive. A neutral exposure defines that the cutting-edge plane is substantially coplanar with the shaving plane. A negative exposure implies that the cutting-edge plane is nearer to the base support member of the razor cartridge than the shaving plane or below the shaving plane. A positive exposure implies that the cutting-edge plane is further from the base support member compared to the shaving plane or above the shaving plane. As shown in any of FIGS. 6 to 10, the plurality of teeth of the blade elements 10 extend at least partially beyond the shaving plane SH. In more detail, at least the curved portion of the teeth extend at least partially beyond the shaving plane SH.

Figure 6A:
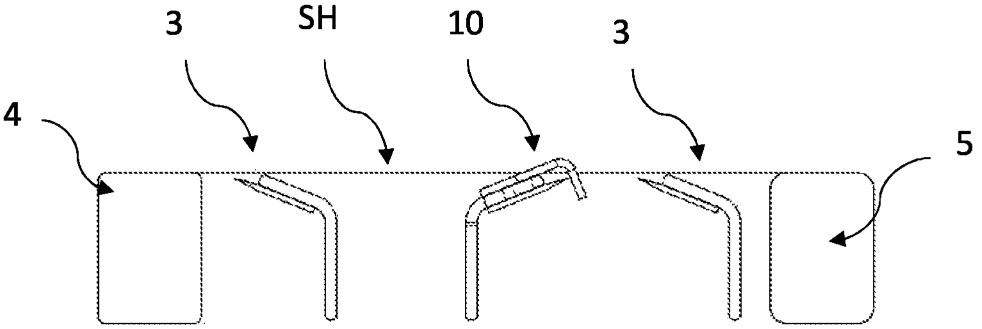
FIG. 6*a* shows a schematic view of a razor cartridge arrangement according to the present disclosure, including a blade element as illustrated in FIGS. 1*a* to 1*c*.
Figure 6B:
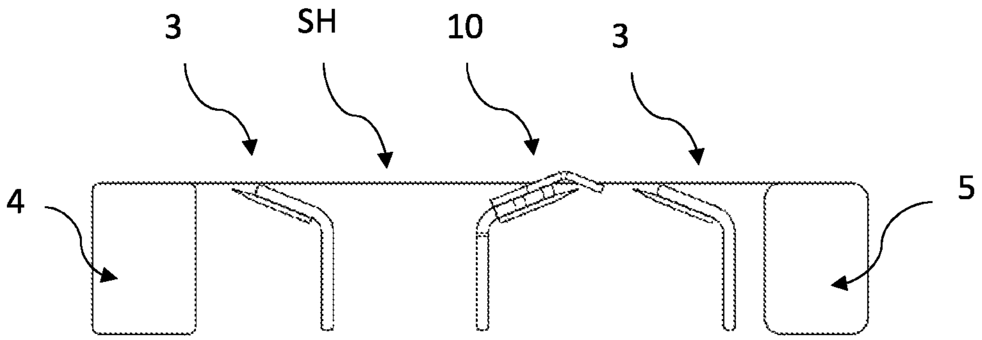
FIG. 6*b* shows a schematic view of a razor cartridge arrangement according to the present disclosure, including a blade element as illustrated in FIGS. 2*a* and 2*b*.
Figure 7:
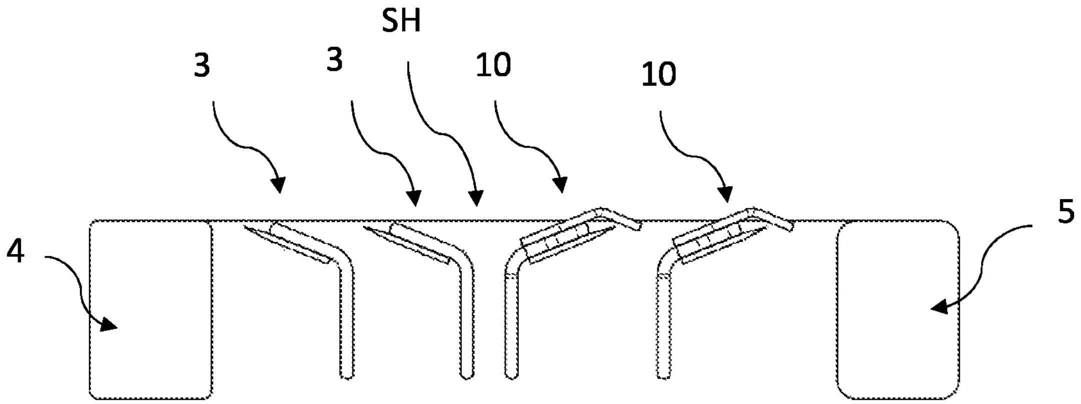
FIGS. 7 to 10 show schematic views of alternative razor cartridge arrangements according to the present disclosure.

FIGS. 6*a*, 6*b* and 7 illustrate razor cartridge arrangements, wherein the cutting members 3 can be oriented towards the first longitudinal side 4 and at least one blade element 10 can be oriented towards the second longitudinal side 5 of the razor cartridge housing. Generally, such types of razor cartridges can be used for safety razors with multiple (e.g. two, such as in the examples) shaving directions. The directions can be opposite direction such as in the illustrated examples. In other examples not shown, the directions may be with an angle towards each other. FIG. 6*a* is a schematical side cut view of the arrangement of cutting members 3 and a blade element 10 as shown in FIGS. 5*a* and 5*b*. FIG. 6*b* is a schematical side cut view of the same arrangement of cutting members 3 and blade element 10 as in FIG. 6*a*, with the exception that the blade element 10 corresponds to the one in the example illustrated in FIGS. 2*a* and 2*b*, wherein the bent portion 114 of the plurality of teeth 112 can present a bigger angle α. In both examples and in the example shown in FIG. 9, the at least one blade element 10 can be arranged between at least two cutting members 3. In some examples, at least one blade element 10 can be arranged at the last position seen from the first longitudinal side 4 of the razor cartridge housing. In other examples as in FIG. 7, at least two cutting members 3 can be blade elements 10, and these blade elements 10 can be arranged at the latest positions seen from the first longitudinal side 4 of the razor cartridge housing.

Figure 8:
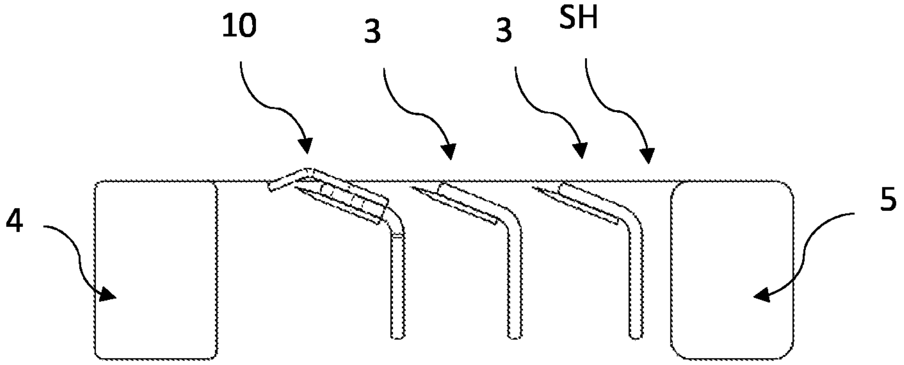
Figure 9:
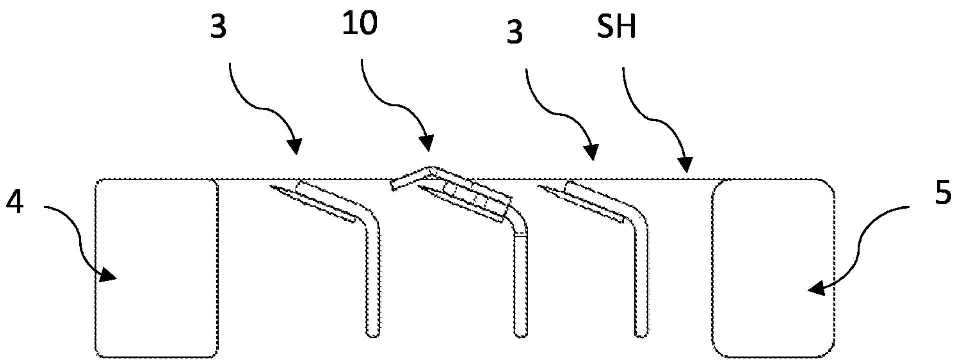
Figure 10:
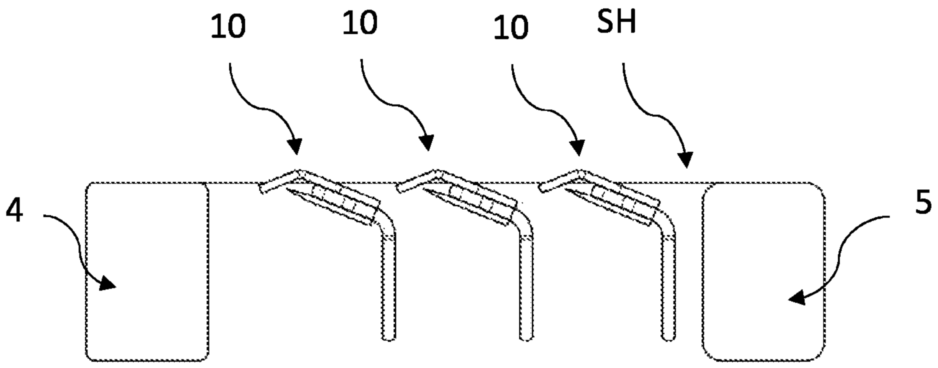

FIGS. 8 to 10 illustrate razor cartridge arrangements, wherein the cutting members 3 and the at least one blade element 10 can be oriented towards the first longitudinal side 4 of the razor cartridge housing. This means that none of the cutting members 3 nor the least one blade element 10 would be oriented in another direction. Generally, such types of razor cartridges can be used for safety razors with only one shaving direction. As shown in FIG. 8, the at least one blade element 10 can be arranged at the first position seen from the first longitudinal side 4 of the razor cartridge housing. FIG. 9 shows that the at least one blade element 10 can be arranged between at least two cutting members 3.

In the examples illustrated in FIGS. 6*a*, 6*b*, and 7, the razor cartridges including the cutting members 3 and/or the blade elements 10 can be operated in two shaving directions. When moving the razor cartridge in a first shaving direction (i.e. in the direction wherein the first longitudinal side 4 may represent a leading longitudinal side and wherein the second longitudinal side 5 may represent a trailing longitudinal side), the cutting edges of the cutting members 3 and/or blade elements 10 oriented towards the first longitudinal side 4 can shave an area to be treated. When moving the razor cartridge in a second shaving direction (e.g., opposite to the first shaving direction), the cutting edges of the cutting members 3 and/or blade elements oriented towards the second longitudinal side 5 can shave an area to be treated. When operating in either shaving direction, the respective cutting edges that do not actively take part in the shaving operation (i.e. cutting the hairs) can support the skin (and prevent or reduce the formation of skin bulges in some examples). In this manner, the cutting members and/or blade elements of the present disclosure can allow for multiple shaving directions and improve the shaving performance in some examples.

In any of the examples and others not shown, the at least one blade element 10 can be arranged at a first position seen from the first longitudinal side 4 of the razor cartridge housing. In other examples as e.g. in FIG. 10 and others, all cutting members may be blade elements 10. The blade elements 10 may all be oriented in the same direction or alternatively, in different directions. In case of the presence of cutting members 3 and blade elements 10, these may all be oriented in the same direction or alternatively in different directions depending on the shaving directions of the safety razor. In any arrangement, the comb-like element can be used to orient and guide the hairs. With this, unruly and/or curly hairs may be combed such that the cutting is facilitated. This allows for a quick and proper shaving in a low number of passes—ideally in one pass—and avoids approaching the hairs several times, eventually even from different directions. The comb-like element of the blade element can also provide for additional skin support to reduce skin bulge and, in turn, nicks and cuts. As the comb-like element is in contact with the skin while shaving, the skin is evened in the contact area, which allows for a better positioning of the hairs towards the cutting edge.

The blade elements 10 as illustrated in FIGS. 6*b* to 10 can all be the same, i.e. present the same dimensions and be manufactured with the same manufacturing process. This provides the advantage that the diversity of blade elements can be reduced. As a result, costs such as e.g. manufacturing and logistic costs can be reduced. This reduction of diversity can similarly be applied to the cutting members used in the razor cartridges.

The disclosed examples are only some of several possibilities of cutting member and/or blade elements arrangements within a razor cartridge housing and are not supposed to be limiting. Any other arrangement not shown may be considered in view of the scope of the present disclosure.

The present disclosure also relates to a shaving razor assembly including a razor handle and a razor cartridge as described in the present disclosure. The razor cartridge can be releasably attached to the razor handle, e.g., via a pivotable connection. In other examples, the razor cartridge can be releasably attached to the razor handle via a non-pivotable connection. In still other examples, the razor cartridge is integrally formed with the razor handle including a pivotable connection. In still other examples, the razor cartridge is integrally formed with the razor handle including a non-pivotable connection.

The present disclosure also relates to a kit of parts including a razor handle and a razor cartridge holder comprising a plurality of razor cartridges as described in the present disclosure.

The present disclosure also relates to a kit of parts including a razor cartridge holder and a plurality of razor cartridges as described in the present disclosure.

The present disclosure also relates to the cutting members, razor cartridges, razors and kits and of the following aspects:

1. A blade element for a razor cartridge comprising
   - a blade support comprising a base portion and a bent upper portion;
   - a blade arranged at the upper portion of the blade support and comprising a cutting edge; and
   - a comb-like element comprising:
     - a shaft portion; and
     - a plurality of teeth;
   - wherein the comb-like element is arranged parallel to the blade; and
   - wherein the plurality of teeth extend parallel to each other from the shaft portion to beyond the cutting edge of the blade;
   - characterized in that
   - the comb-like element is disposed above the blade.

2. The blade element according to aspect 1, wherein the comb-like element and the blade are fixedly attached to the blade support, wherein the comb-like element and the blade are arranged on either side of the upper portion of the blade support.

3. The blade element according to aspect 1, wherein the blade is integrally formed with the blade support.

4. The blade element according to aspect 3, wherein the comb-like element is fixedly attached on top of the upper portion of the blade support.

5. The blade element according to any of the preceding aspects, wherein the plurality of teeth is integrally formed with the shaft portion.

6. The blade element according to any of the preceding aspects, wherein each tooth comprises a portion that is bent about the cutting edge of the blade.

7. The blade element according to any of the preceding aspects, wherein each of the tooth has a rounded end.

8. The blade element according to any of the preceding aspects, wherein the bent portion of each tooth has an angle of 90° or more towards a plane surface formed by the shaft portion of the comb-like element.

9. A razor cartridge comprising a razor cartridge housing;

a group of cutting members, wherein at least one cutting member is a blade element according to any of aspects 1 to 8;

wherein the cutting members are arranged behind one another between a first longitudinal side and a second longitudinal side of the razor cartridge housing.

10. The razor cartridge according to aspect 9, wherein the cutting members are oriented towards the first longitudinal side and the at least one blade element is oriented towards the second longitudinal side of the razor cartridge housing.

11. The razor cartridge according to aspect 10, wherein the at least one blade element is arranged between at least two cutting members.

12. The razor cartridge according to aspect 10, wherein the at least one blade element is arranged at a last position seen from the first longitudinal side of the razor cartridge housing.

13. The razor cartridge according to aspect 10, wherein at least two cutting members are blade elements and wherein the blade elements are arranged at latest positions seen from the first longitudinal side of the razor cartridge housing.

14. The razor cartridge according to aspect 9, wherein the cutting members and the at least one blade element are oriented towards the first longitudinal side of the razor cartridge housing.

15. The razor cartridge according to aspect 14, wherein the at least one blade element is arranged between at least two cutting members.

16. The razor cartridge according to aspect 14, wherein the at least one blade element is arranged at a first position seen from the first longitudinal side of the razor cartridge housing.

17. The razor cartridge according to any of aspects 9 to 16, wherein all cutting members are blade elements.

18. The razor cartridge according to any of aspects 9 to 17, wherein blade elements are rigidly arranged within the razor cartridge housing.

19. The razor cartridge according to any of aspects 9 to 18, wherein the plurality of teeth extend at least partially beyond a shaving plane.

20. A shaving razor assembly comprising a razor handle; and a razor cartridge according to any of aspects 9 to 19.

21. A kit of parts comprising:

a razor handle; and a razor cartridge holder comprising a plurality of razor cartridges according to any one of aspects 9 to 19.

22. A kit of parts comprising:

a razor cartridge holder; and a plurality of razor cartridges according to any one of aspects 9 to 19.

REFERENCE NUMERALS

1 razor cartridge
2 razor cartridge housing
3 cutting member
4 first longitudinal side
5 second longitudinal side
6 skin guard
7 cap element
8*a*, 8*b*, 8*c* seat portions
10 blade element
11 comb-like element
12 blade support
13 blade
111 shaft
112 tooth
113 space
114 bent portion of the tooth
121 base portion
122 upper portion
131 cutting edge
$\alpha$ angle
SH shaving plane

The invention claimed is:

1. A blade element for a razor cartridge comprising:

a blade support comprising a base portion and a bent upper portion, wherein the bent upper portion protrudes from an end of the base portion;

a blade arranged at the bent upper portion of the blade support and comprising a cutting edge; and a comb element that is configured to orient and guide hairs to the cutting edge of the blade, the comb element comprising:

a shaft portion; and a plurality of teeth;

wherein the blade is attached to a first side of the bent upper portion of the blade support;

wherein the comb element is arranged parallel to the blade;

wherein the plurality of teeth extend parallel to each other from the shaft portion to beyond the cutting edge of the blade;

wherein the comb element is disposed above the blade and attached to a second side of the bent upper portion of the blade support, and each of the plurality of teeth of the comb element comprise a bent portion that is bent about the cutting edge of the blade;

wherein a first surface of the blade is in contact with the blade support and a second surface of the blade, opposite of the first surface of the blade, faces away from a shaving plane; and wherein a portion of the first surface of the comb element is in contact with the blade support and a second surface of the blade support, opposite of the first surface of the comb element, faces the shaving plane.

2. The blade element according to claim 1, wherein the comb element and the blade are fixedly attached to the blade support, and wherein the first side is opposite to the second side of the bent upper portion of the blade support.

3. The blade element according to claim 1, wherein the blade is integrally formed with the blade support.

4. The blade element according to claim 3, wherein the comb element is fixedly attached on top of the bent upper portion of the blade support.

5. The blade element according to claim 1, wherein the plurality of teeth is integrally formed with the shaft portion.

6. The blade element according to claim 1, wherein each of the plurality of teeth includes a rounded end.

7. The blade element according to claim 1, wherein the bent portion of each of the plurality of teeth has an angle of 90° or more towards a plane surface formed by the shaft portion of the comb element.

8. A razor cartridge comprising:

a razor cartridge housing;

a group of cutting members, wherein at least one cutting member is the blade element according to claim 1;

wherein each cutting member subsequent to a first cutting member in the group of cutting members is arranged behind one another between a first longitudinal side and a second longitudinal side of the razor cartridge housing.

9. The razor cartridge according to claim 8, wherein each cutting member in the group of cutting members is oriented towards the first longitudinal side and the at least one blade element is oriented towards the second longitudinal side of the razor cartridge housing.

10. The razor cartridge according to claim 8, wherein each cutting member in the group of cutting members and the at least one blade element are oriented towards the first longitudinal side of the razor cartridge housing.

11. The razor cartridge according to claim 8, wherein each cutting member in the group of cutting members is a blade element.

12. The razor cartridge according to claim 8, wherein the blade elements are rigidly arranged within the razor cartridge housing.

13. The razor cartridge according to claim 8, wherein at least one cutting member of the group of cutting members is movably arranged within the razor cartridge housing.

14. The razor cartridge according to claim 8, wherein each tooth in the plurality of teeth extends at least partially beyond the shaving plane.

15. A shaving razor assembly comprising:

a razor handle; and the razor cartridge according to claim 8.

16. A razor assembly comprising:

a first blade element comprising:

a first blade support comprising a first base portion and a first bent upper portion;

a first blade attached at a first side of the first bent upper portion of the first blade support and comprising a cutting edge; and a comb element comprising:

a shaft portion; and a plurality of teeth;

wherein the comb element is arranged parallel to and immediately adjacent above the first blade;

wherein the plurality of teeth extend parallel to each other from the shaft portion to beyond the cutting edge of the first blade and the comb element is disposed above the first blade and attached to a second side of the first bent upper portion of the first blade support;

wherein each of the plurality of teeth of the comb element comprise a bent portion bent over the cutting edge of the first blade;

wherein a first surface of the first blade is in contact with the first blade support and a second surface of the first blade, opposite of the first surface of the first blade, faces away from a shaving plane; and wherein a portion of the first surface of the comb element is in contact with the first blade support and a second surface of the comb element, opposite of the first surface of the comb element, faces the shaving plane.

17. The razor assembly of claim 16, wherein the bent portion of each of the plurality of teeth:

(a) has an angle of 90° or more towards a plane surface formed by the shaft portion of the comb element, and (b) extends forward of the first blade in a shaving direction and intersects a cutting plane of the first blade.

18. A first blade element comprising:

a first blade support comprising a first base portion and a first bent upper portion;

a first blade attached at a first side of the first bent upper portion of the first blade support and comprising a cutting edge; and a comb element that is configured to orient and guide hairs to the cutting edge of the first blade, the comb element comprising:

a shaft portion; and a plurality of teeth;

wherein the comb element is arranged parallel to and immediately adjacent above the first blade;

wherein the plurality of teeth extend parallel to each other from behind the cutting edge of the first blade to beyond the cutting edge of the first blade at a portion that is bent about the cutting edge of the first blade;

wherein a first surface of the first blade is in contact with the first blade support and a second surface of the first blade, opposite of the first surface of the first blade, faces away from a shaving plane; and wherein a portion of the first surface of the comb element is in contact with the first blade support and a second surface of the comb element, opposite of the first surface of the comb element, faces the shaving plane.

19. The first blade element according to claim 18, wherein each of the plurality of teeth comprise a bent portion that is bent about the cutting edge of the first blade.

20. The first blade element according to claim 19, wherein the bent portion of each of the plurality of teeth has an angle of 90° or more towards a plane surface formed by the shaft portion of the comb element.

* * * * *